United States Patent
Sitarski et al.

(10) Patent No.: US 6,470,982 B2
(45) Date of Patent: Oct. 29, 2002

(54) CHILDREN'S RIDE-ON VEHICLE WITH MECHANICAL SPEED CONTROL

(75) Inventors: Gerald P. Sitarski, Grand Island, NY (US); Daniel Dignitti, Hamburg, NY (US); Steven Robert Drosendahl, Hamburg, NY (US); Walter C. Miazga, East Aurora, NY (US); Douglas A. Knight, N. Tonawanda, NY (US)

(73) Assignee: Mattel, Inc., El Segundo, CA (US)

(*) Notice: Subject to any disclaimer, the term of this patent is extended or adjusted under 35 U.S.C. 154(b) by 0 days.

(21) Appl. No.: 09/780,595

(22) Filed: Feb. 8, 2001

(65) Prior Publication Data

US 2002/0104695 A1 Aug. 8, 2002

(51) Int. Cl.[7] .................................................. B60K 1/00
(52) U.S. Cl. ....................................................... 180/65.1
(58) Field of Search ................................ 180/65.1, 6.5, 180/6.66, 65.6, 336; 446/448

(56) References Cited

U.S. PATENT DOCUMENTS

| | | |
|---|---|---|
| 844,550 A | 2/1907 | Thomasson |
| 844,844 A | 2/1907 | Baker |
| 1,015,394 A | 1/1912 | Mustin |
| 1,051,995 A | 2/1913 | Gundersen |
| 1,089,121 A | 3/1914 | Ewing |
| 1,550,817 A | 8/1925 | Karge |
| 1,916,786 A | 7/1933 | Elliott |
| 3,200,918 A | 8/1965 | Horn |
| 3,486,597 A | 12/1969 | Carlton |
| 3,905,209 A | * 9/1975 | Conrad ........................ 464/60 |
| 4,480,490 A | * 11/1984 | Inoue ....................... 192/89.25 |
| 4,560,022 A | 12/1985 | Kassai |
| 4,568,307 A | 2/1986 | Gabler et al. |
| 4,582,030 A | 4/1986 | Reese |
| 5,088,581 A | 2/1992 | Duve |
| 5,570,752 A | 11/1996 | Takata |
| 5,699,869 A | * 12/1997 | Fritzinger et al. ......... 180/65.5 |
| 5,791,190 A | 8/1998 | Konno |

* cited by examiner

*Primary Examiner*—Jack Lavinder
*Assistant Examiner*—C. T. Bartz
(74) *Attorney, Agent, or Firm*—Kolisch Hartwell, P.C.

(57) ABSTRACT

A children's ride-on vehicle with a reduced scale chassis having a seat configured to accommodate at least one child. The vehicle further includes a drive assembly, which includes one or more drive wheels and a battery powered motor assembly. The battery powered motor assembly includes a motor output and a torque attenuation system, which is configured to regulate the transmission of torque from the motor assembly to the one or more drive wheels. The torque attenuation system incorporates a force reducing mechanism adapted to receive a rotational input from the motor output and regulate the transmission of that rotational input to the one or more drive wheels. In some embodiments of the invention, the torque attenuation system is a self-contained system, and in some embodiments of the invention, the torque attenuation system is adapted to be retrofit on existing children's ride-on vehicles.

59 Claims, 8 Drawing Sheets

CHILDREN'S RIDE-ON VEHICLE WITH MECHANICAL SPEED CONTROL

FIELD OF THE INVENTION

The present invention relates generally to children's ride-on vehicles. More specifically, the invention relates to a children's ride-on vehicle having a drive assembly adapted to reduce the forces applied to the vehicle, such as during changes in speed and direction.

BACKGROUND OF THE INVENTION

Children's ride-on vehicles are reduced-scale vehicles that are designed for use by children. For example, children's ride-on vehicles include a seat adapted to accommodate a child and a steering mechanism and drive assembly adapted to be operated by a child sitting on the seat. One type of drive assembly that is often used in children's ride-on vehicles includes a battery-powered motor assembly that is adapted to drive one or more of the vehicle's wheels. Typically, the vehicle will include an actuator, such as a foot pedal or other user input device, that enables a child to select when power is delivered to the motor assembly. Some drive assemblies further include other user input devices, such as a speed selector and a direction selector, that are operated by a child sitting on the vehicle's seat to select the speed and direction at which the vehicle travels.

One problem that children's ride-on vehicles experience is damage to the vehicle body or drive assembly that is caused by changes in speed and direction, and especially by rapid acceleration or sudden changes in direction. Under a rapid acceleration or sudden change in direction, the inertial forces of the vehicle have to be overcome. The vehicle's drive assembly bears much of the burden of overcoming the inertial forces, and therefore these forces can damage the components of the drive assembly. The vehicle's body also bears some of the inertial forces, and therefore it too may be damaged during sudden changes in speed and direction. If these forces are significant enough, they may render a portion of the vehicle inoperational, thereby requiring repair or replacement of the vehicle. Even if immediate damage does not occur, repeated application of these forces may cause wearing and or deformation of the vehicle's body or drive assembly, which over time may also render the vehicle inoperational. The likelihood of damage to the vehicle increases as the size of the vehicles increases, as the vehicles are designed to move faster, and as the weight carried by the vehicles increases.

SUMMARY OF THE INVENTION

A children's ride-on vehicle according to the present invention includes a reduced scale chassis having a seat configured to accommodate at least one child. The vehicle further includes a drive assembly, which includes one or more drive wheels and a battery powered motor assembly. The battery powered motor assembly includes a motor output and a torque attenuation system, which is configured to regulate the transmission of torque from the motor assembly to the one or more drive wheels. The torque attenuation system incorporates a force-reducing mechanism adapted to receive a rotational input from the motor output and regulate the transmission of that rotational input to the one or more drive wheels.

DETAILED DESCRIPTION AND BEST MODE OF THE INVENTION

Figure 1:
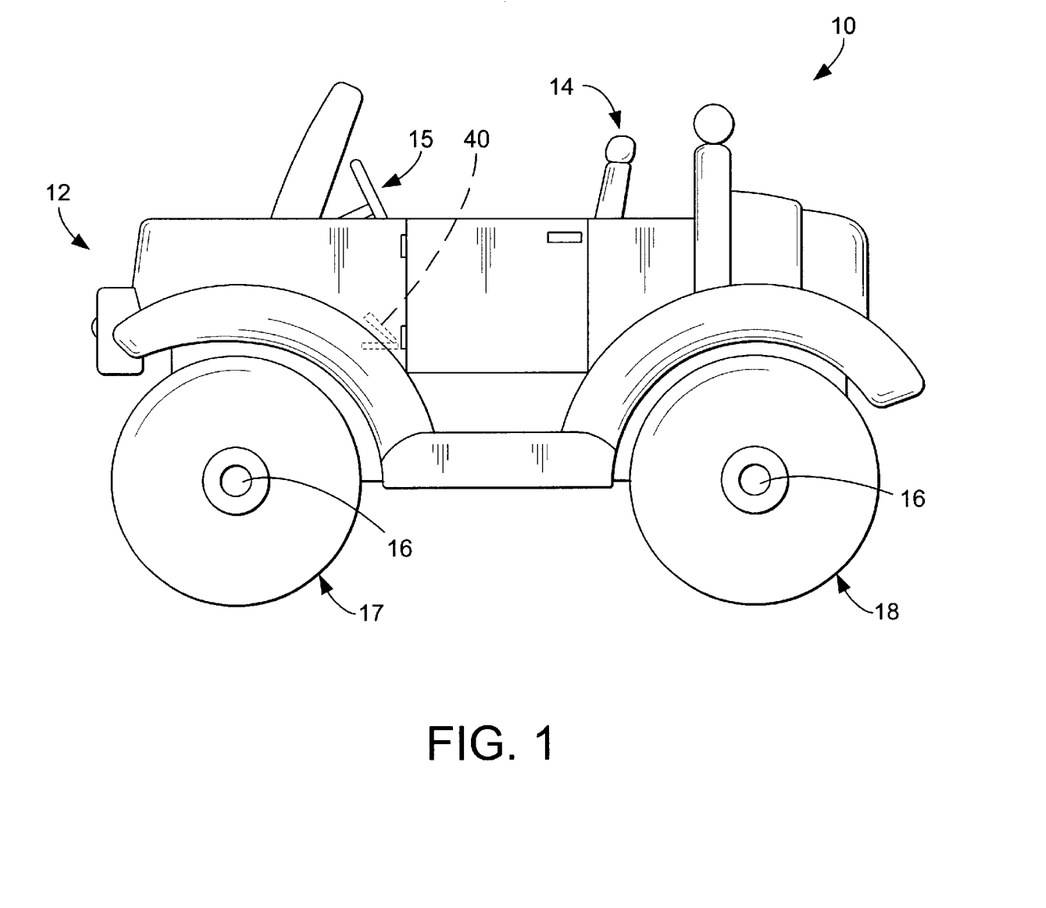
FIG. 1 is a side elevation view of a children's ride-on vehicle constructed according to the present invention.

A children's ride-on vehicle constructed according to the present invention is shown in FIG. 1 and indicated generally at 10. Ride-on vehicle 10 includes a body, or chassis, 12 that provides a riding space with a seat 14 sized to accommodate at least one child, including a child driver. Typically, vehicle 10 will be sized for use either by a child driver, or a child driver and a child passenger. Body 12 typically is formed from molded plastic, and may be integrally formed or formed from a plurality of parts that are secured together by screws, clips or other suitable fasteners. Alternatively, body 12 may be made of some other suitable material including metal, wood, or composite structure having suitable strength to accommodate and support the weight of at least one child. Seat 14 may be integral with or mounted on body 12. Seat 14 is sized to accommodate at least one child and can have any suitable configuration, such as a bucket, bench or saddle configuration.

As shown, body 12 is shaped to generally resemble a reduced-scale truck. It should be understood that a children's ride-on vehicle according to the present invention may be shaped to generally resemble any type of vehicle. Examples of suitable vehicles are reduced-scale or child-sized vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. When a children's ride-on vehicle is sized and shaped to generally resemble an adult-sized vehicle, its body and/or other components will often generally resemble corresponding components on the full-sized vehicle. However, it is also within the scope of the present invention that vehicle 10 may be shaped to resemble fantasy vehicles that do not have a corresponding full-sized counterpart.

As shown in FIG. 1, a steering mechanism 15 is positioned on vehicle 10 for operation by a child sitting on seat 14. Steering mechanism 15 is any suitable structure that is positioned for operation by a child sitting on seat 14 and which allows the child to steer at least one of the vehicle's wheels through any suitable mechanical linkage between the steering mechanism and the corresponding wheel or wheels, which may be referred to as steerable wheels. As shown, steering mechanism 15 takes the form of a steering wheel, but it should be understood that other suitable structures, such as handle bars and steering levers may be used.

Also shown in FIG. 1 are wheels 17 and 18 that are mounted on axles 16. Vehicle 10 includes a plurality of wheels, at least one of which is a steerable wheel that is adapted to be steered responsive to user manipulation of the steering mechanism. At least one of the plurality of wheels is adapted to be rotatably driven by the vehicle's drive assembly, which is discussed in more detail subsequently. It should be understood that the driven and steerable wheels may be the same or different wheels. In FIG. 1, it should be understood that vehicle 10 includes four wheels, with two wheels mounted on each axle 16. It is within the scope of the present invention, however, that vehicle 10 may include any number of wheels, from two wheels to more than four wheels, although children's ride-on vehicles typically include at least three wheels for stability.

Figure 2:
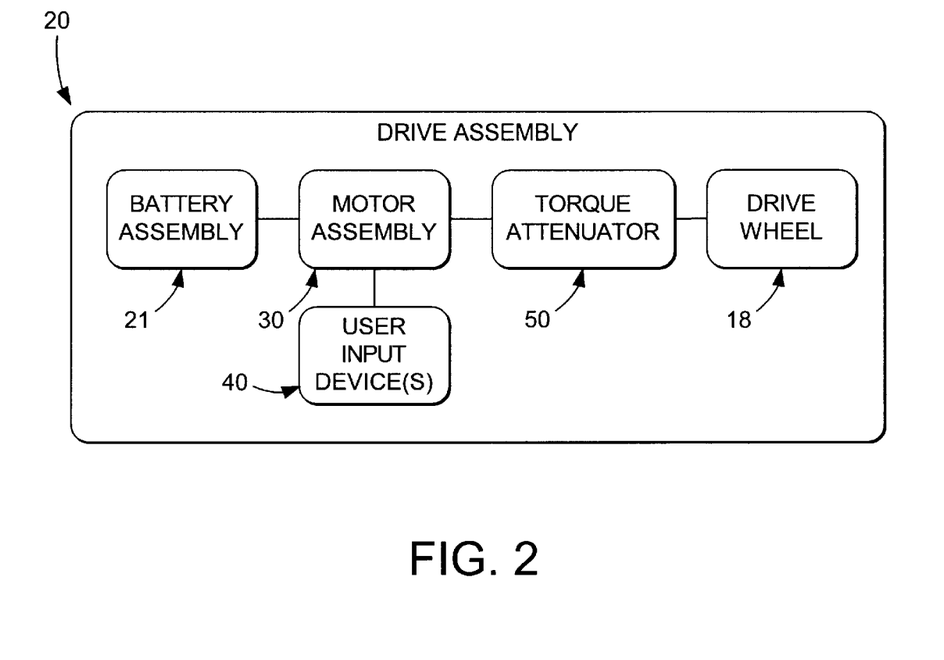
FIG. 2 is a schematic diagram of a drive assembly for the children's ride-on vehicle of FIG. 1.

As shown schematically in FIG. 2, vehicle 10 includes a drive assembly 20 that includes a battery assembly 21, a motor assembly 30, at least one user input device 40, a torque attenuator 50, and at least one drive wheel 18. These components are operatively linked electrically and/or mechanically to provide for propulsion and control of vehicle 10 by a child sitting on seat 14. It should be understood that any number of suitable mechanical and electrical interconnections, as known in the art, may be used to link the components of drive assembly 20.

Battery assembly 21 includes one or more batteries adapted to provide electrical power to motor assembly 30. The one or more batteries are connected to the electrical system of vehicle 10 by a wiring harness (not shown). The wiring harness connects battery assembly 21 to motor assembly 30 and user input device 40. Battery assembly 21 may include any selected number and type of batteries, such as 6-volt batteries and/or 12-volt batteries. The wiring harness may be adapted to permit the batteries of battery assembly 21 to be wired in series or parallel to allow user-control of the voltage or amperage running through the circuit.

Figure 6:
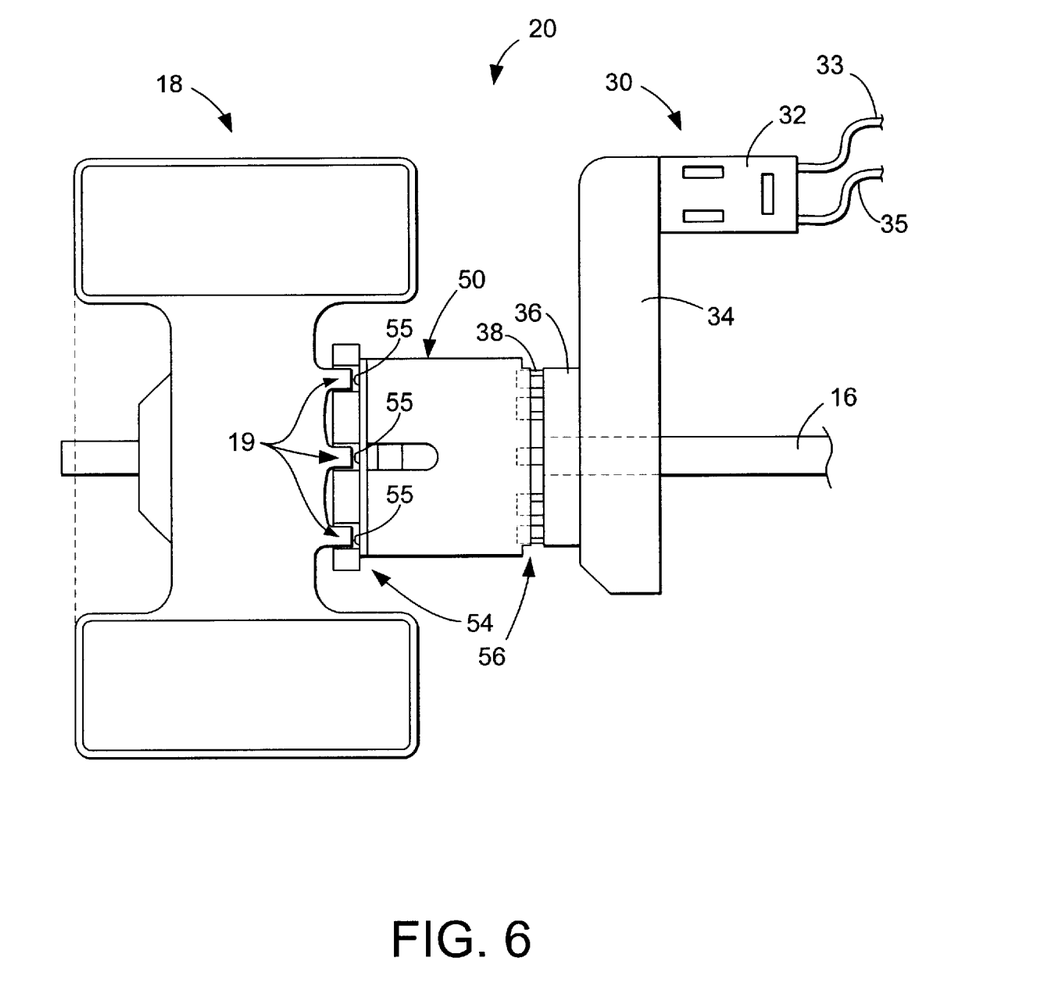
FIG. 6 is a fragmentary side elevation view of another torque attenuator according to the present invention.

As shown in FIG. 2, motor assembly 30 is electrically coupled to battery assembly 21, user input device 40 and torque attenuator 50. Motor assembly 30 includes one or more motors that have an output which is directly connected to torque attenuator 50, or which are coupled to the torque attenuator via a drive linkage, such as a gearbox, chain or belt drive, worm gear, or the like that connects the rotational output of the motor to the torque attenuator. Referring briefly to the embodiment shown in FIG. 6, an illustrative example of a suitable motor assembly 30 is shown. As shown, motor assembly 30 includes a motor 32 operatively connected to a gearbox 34, and wired to the battery assembly through a portion of the wiring harness shown at 33 and 35. The gearbox includes any suitable number and size of gear structures known in the art and connects to a motor output 36 which may include output teeth 38. It should be understood that while output teeth are shown in FIG. 6, any other suitable structure adapted to drivingly engage the torque attenuator to allow the transmission of rotation therebetween may be employed in the present invention. It should be understood that the term "motor output," as used herein, is meant to refer to the output from the motor assembly, which in some embodiments may be the output pinion from the motor itself, and in others may be the output from a gearbox, a worm drive, a belt, or the like.

Returning to FIG. 2, user input device 40 is operatively connected to motor assembly 30. Typically, user input device 40 includes an electrical switch that governs the flow of electrical power to the motor assembly. An example of such a user input device is shown in FIG. 1 in the form of a foot pedal that is positioned within the passenger region for actuation by a child sitting on seat 14. Other suitable user input devices include throttles, on/off switches and levers that a user manually actuates to cause driven motion of the vehicle. It is within the scope of the invention that the drive assembly may include more than one user input device 40. For example, it may include switches or mechanical linkages that are adapted to control the direction at which the vehicle travels and the operating speed or range of speeds of the vehicle. As a further example, a pair of batteries and/or a pair of motors may be selectively configured between series and parallel configurations responsive to user inputs to one or more devices 40.

Torque attenuator 50 is incorporated into the drive assembly between motor assembly 30 and drive wheel 18. As discussed in detail below the torque attenuator receives a rotational input from the motor output and regulates the transmission of that rotational input to drive wheel 18. Drive wheel 18 receives rotational output from the motor output and propels vehicle 10 as it rotates. Drive wheel 18 includes a hub assembly, which may be integral with the drive wheel or may be an additional component adapted to be coupled to drive wheel 18. As described below the hub assembly is adapted to engage the torque attenuator. Alternatively, the hub assembly may be adapted to engage a mechanical spacer to transmit the rotation from the torque attenuator to the drive wheel. As discussed previously, vehicle 10 may include one or more driven wheels. For purposes of brevity, the following discussion will refer to a drive wheel, although it should be understood that the vehicle may include two or more drive wheels, each of which may be linked to the motor assembly by a torque attenuator according to the present invention.

Figure 3:
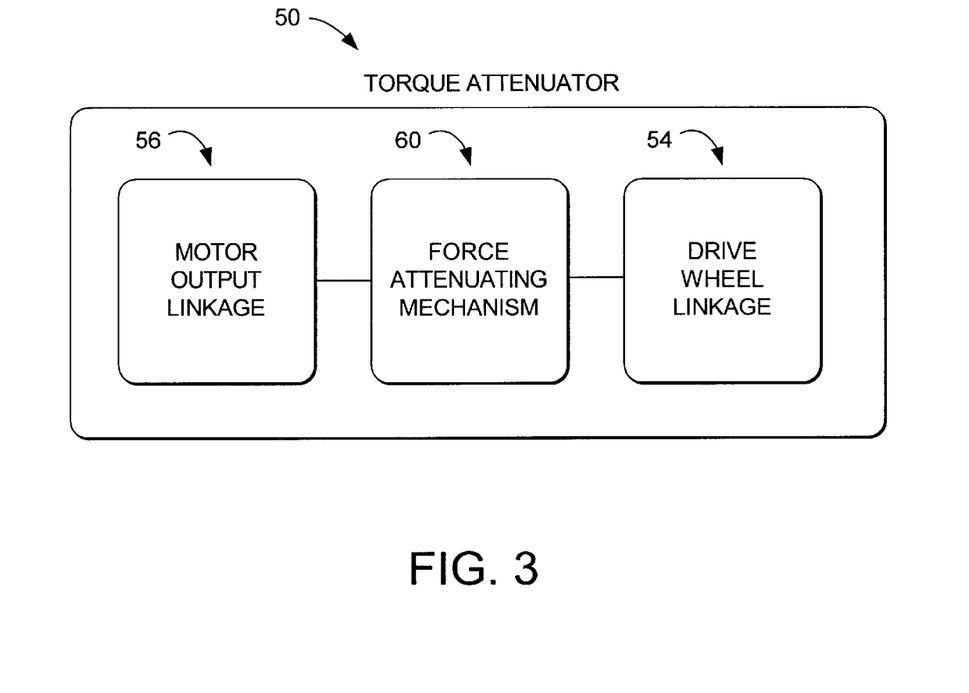
FIG. 3 is a schematic diagram of a torque attenuator for the drive assembly of FIG. 2.

Turning to FIG. 3, a schematic view of a torque attenuator according to the present invention is shown and generally indicated at 50. As shown, torque attenuator 50 includes a drive wheel linkage 54, a motor output linkage 56 and a force attenuating mechanism 60. The torque attenuator is configured to receive a torque force, or rotational input, from motor output linkage 56 and selectively transmit the torque to drive wheel linkage 54. The torque attenuator regulates the transmission of rotational motion from the motor output to the drive wheel. Motor output linkage 56 receives rotational input from the motor output, and transmits the rotational input to force attenuating mechanism 60. Force attenuating mechanism 60 may also be referred to as a force reducing mechanism. The force attenuating mechanism regulates the transmission of the rotational input received from motor output linkage 56 to drive wheel linkage 54.

Although torque attenuator 50 is shown as a separate unit from the gearbox and motor output, it should be understood that the torque attenuator may alternatively be incorporated into the gearbox.

Figure 4:
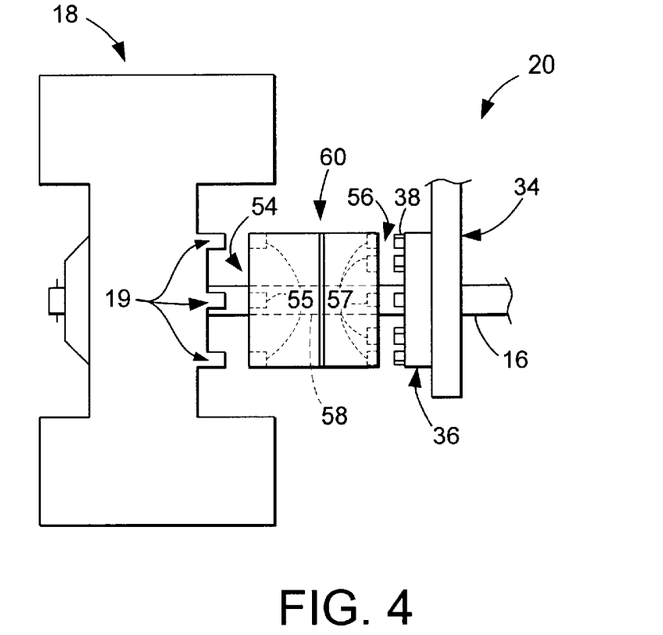
FIG. 4 is a fragmentary side elevation view of the drive assembly of FIG. 2 shown partially exploded along the axle for detail and including the torque attenuator of FIG. 3.
Figure 5:
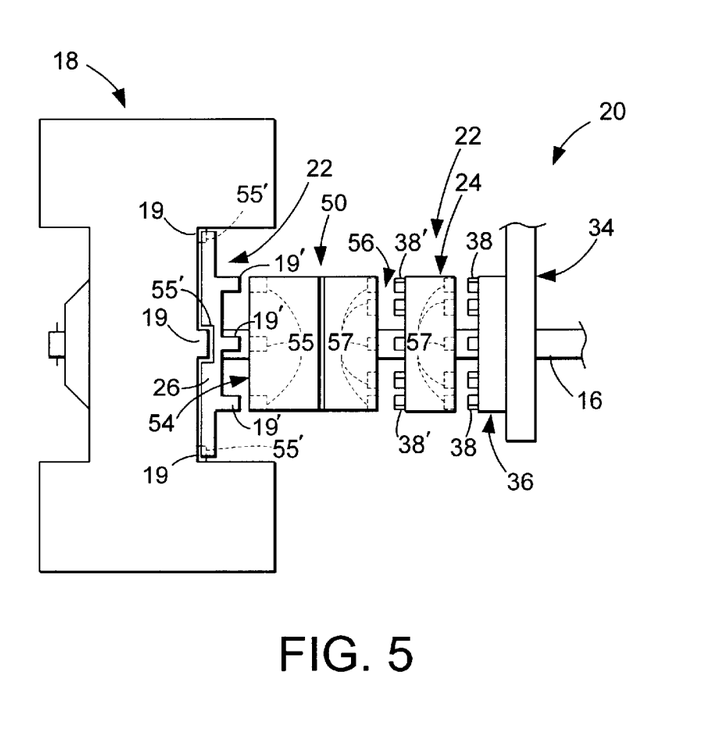
FIG. 5 is a fragmentary side elevation view of the drive assembly of FIG. 2 shown partially exploded along the axle for detail and including the torque attenuator of FIG. 2 and illustrative embodiments of drive assembly spacers.

Torque attenuator 50 is positioned between drive wheel 18 and motor output 36 as shown in FIGS. 4 and 5. As shown, a through bore 58 passes through the torque attenuator to allow axle 16 of vehicle 10 to pass through the torque attenuator. Drive wheel 18, torque attenuator 50, and motor output 36 are shown spaced-apart along axle 16 for the purposes of showing more detail in both FIGS. 4 and 5. It should be noted that under operating conditions the components would be sufficiently close together to complete the linkages described herein. It should also be understood that it is not essential that the torque attenuator be mounted on axle 16, and that it is within the scope of the invention that the torque attenuator connects the motor output and the drive wheel without being mounted on an axle.

Referring specifically to FIG. 4, torque attenuator 50 is shown with motor output linkage 56 positioned to rotationally couple to motor output 36. Motor output 36 is equipped with a plurality of output teeth 38 configured to cooperate with a recess structure 57 located on motor output linkage 56. It should be understood that while in the exemplary embodiment output teeth 38 insert into corresponding recess structures 57 in motor output linkage mechanism 56, any suitable mechanical interlocking mechanism may be used to rotationally link motor output 36 with motor output linkage 56. Also shown in FIG. 4 is an illustrative embodiment of the torque attenuator's drive wheel linkage 54 positioned to rotationally couple to drive wheel 18. As shown, drive wheel linkage 54 includes a detent structure 55 adapted to cooperate with a portion of drive wheel 18 to rotationally couple the drive wheel linkage to the drive wheel. As illustrated in FIG. 4, detent structure 55 incorporates a recess adapted to receive a corresponding tooth structure 19 in the hub of drive wheel 18. It should be understood that drive wheel linkage 54 may be rotationally coupled to drive wheel 18 by any suitable mechanical interlocking mechanism including, but not limited, to teeth, protrusions, screws, clips, lock pins, adhesives, or interlocking cogs, etc.

Also shown in FIG. 4 is a through bore 58 that enables torque attenuator 50 to be mounted on axle 16, which extends through the attenuator and provides a mount for drive wheel 18. It is within the scope of the present invention that axle 16 may be omitted, with the torque attenuator providing the mount for the drive wheel, or alternatively, that the axle includes a first discrete portion extending between the drive wheel and the drive wheel linkage portion of the torque attenuator, and a second discrete portion extending between the motor output linkage portion of the torque attenuator and the motor assembly.

Alternatively, as shown in FIG. 5, torque attenuator 50 cooperates with one or more spacers 22 that extend between the torque attenuator and the motor output and/or between the torque attenuator and the drive wheel. Spacers 22 may be used to adapt torque attenuator 50 for use on various drive assembly configurations, even if the drive assembly configurations were not originally designed for use with the torque attenuator. More specifically, the spacers maintain a rotational coupling between components of the drive assembly. Examples of suitable spacers 22 are shown in FIG. 5 and include a motor output spacer 24 and a drive wheel spacer 26.

Motor output spacer 24 rotationally connects motor output 36 and torque attenuator 50. Drive wheel spacer 26 rotationally connects torque attenuator 50 and drive wheel 18. For example, in FIG. 5, motor output spacer 24 is shown including recess structure 57' and teeth structure 38' adapted to engage output teeth 38 and recess structure 57 respectively. Similarly, drive wheel spacer 26 is shown including detent structure 19' adapted to cooperate with drive wheel detent structure 55. Drive wheel spacer 26 also includes a detent structure 55' designed to cooperate with engaging structure 19 of drive wheel 18. Spacers 24 and 26 can be used independently of one another or together. Spacers 24 and 26 may be configured to adapt a drive assembly to receive torque attenuator 50. For example, when the motor output is not compatible with the motor output linkage of torque attenuator 50, recess structure 57' can be configured to cooperate with output teeth 38, while at the same time teeth 38' can be adapted to align and cooperate with recess structure 57 of the motor output linkage. Similarly, the drive wheel spacer 26 may be adapted to accommodate differences in drive wheel linkage structure and the drive wheel.

In some embodiments, drive wheel linkage 54 and motor output linkage 56 may be shaped and sized to be functionally equivalent to the coupling structure of motor output 36 and drive wheel 18. By this it is meant that the torque attenuator may be added as an accessory or retrofit to existing children's ride-on vehicles having a motor output adapted to rotationally couple to a driven wheel. This rotational coupling is enabled by corresponding mounting structure on the drive wheel and the motor output, such as the teeth shown in FIG. 4. To add torque attenuator 50 to such a vehicle, the motor output linkage and drive wheel linkage must be shaped to rotationally couple to the motor output and drive wheel. To do this with an existing vehicle, linkages 54 and 56 need to be functionally equivalent to the existing structure that is adapted to form a rotational coupling between the motor output and the drive wheel. To continue this example, spacers 22 may be similarly shaped to continue this rotational coupling. However, it is also within the scope of the present invention that the drive wheel linkage is not functionally equivalent in shape and size to the coupling structure of the motor output and that the motor output linkage is not functionally equivalent in shape and size to the coupling structure of the drive wheel, such as shown in FIG. 4.

Turning to FIG. 6, a portion of a drive assembly 20 with a torque attenuator 50 according to the present invention is shown. It should be understood that vehicle 10 may include a corresponding torque attenuator and drive assembly elements to drive another drive wheel 18 mounted on the same or a different axle. As previously discussed, FIG. 6 illustrates the interconnection of the components of the drive assembly under operating conditions. Torque attenuator 50 is rotatably engaged with both drive wheel 18 and motor output 36. Motor 32 receives electrical input from the vehicle's battery assembly through wires 33 and 35. Motor 32 has an output shaft (not shown) that transmits rotation to gearbox 34, which in turn transmits rotation to motor output 36. Gearbox 34 may transmit the same rate of rotation as it receives from motor 32, but it typically is adapted to increase or decrease the rate of rotation from motor 32 and transmit that augmented rate of rotation to motor output 36.

As discussed, torque attenuator 50 regulates the transmission of rotation from the motor output to the drive wheel. Torque attenuator 50 may also be described as controlling the delivery of rotation to the drive wheel to prevent damage to the vehicle's drive assembly by preventing more than a predetermined amount of torque from being applied at any given time. Two exemplary types of torque attenuation systems are a delay type attenuation system and an interrupt type attenuation system. The delay type attenuation system damps changes in rotational output from the motor output by extending the period of time over which changes in rotational output are transmitted to the drive wheel. Extending the period of time over which changes in rotational output are transmitted also may be referred to as controlling the rate at which the rotational output received by the drive wheel is ramped up. The interrupt type attenuation system is adapted to selectively interrupt, or prevent, the transmission of rotational output from the motor output to the drive wheel.

Figure 7:
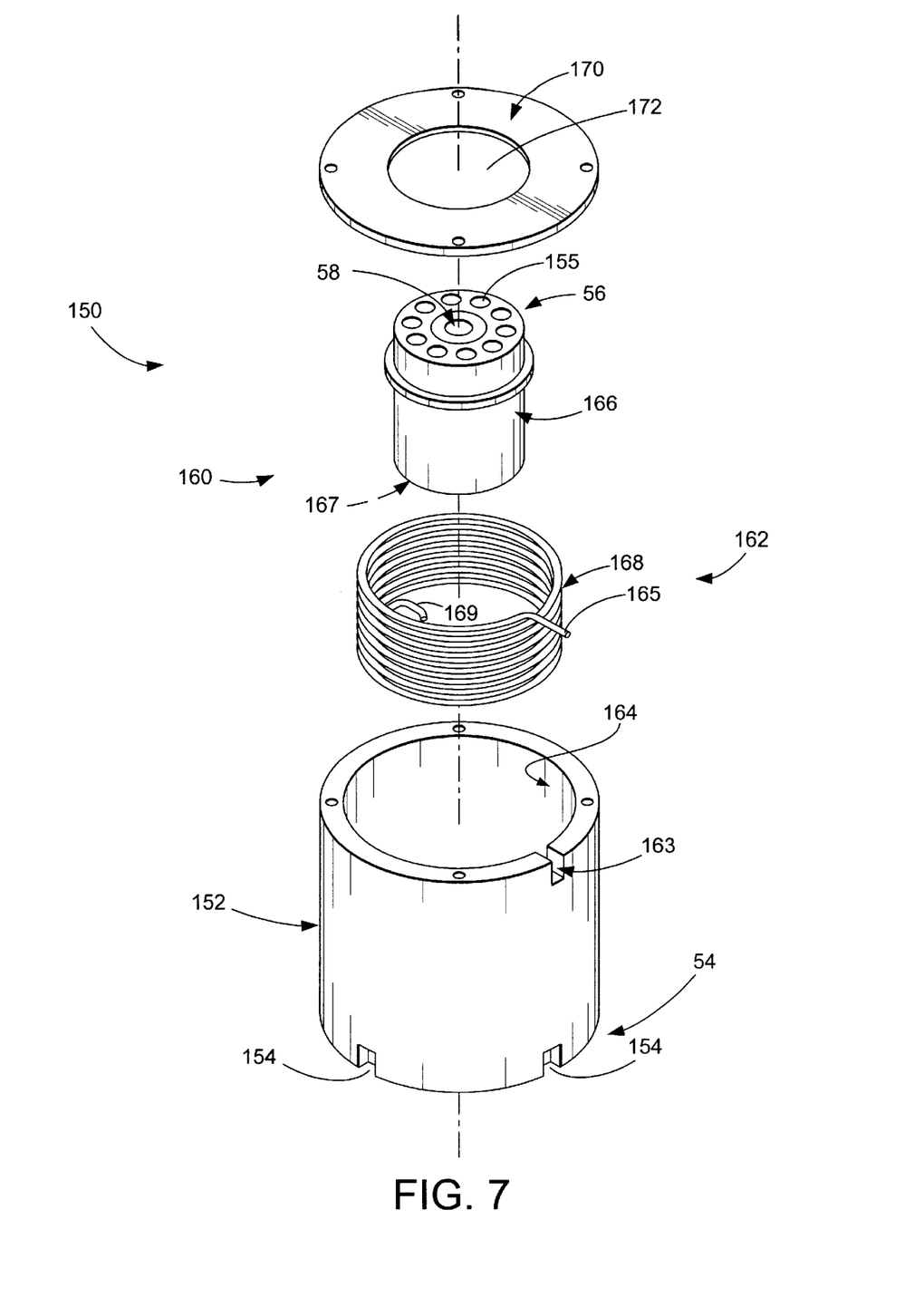
FIG. 7 is an exploded isometric view of the torque attenuator of FIG. 6.

FIG. 7 shows an exploded assembly view of an illustrative embodiment of a delay type torque attenuation system, which is generally indicated at 150. Torque attenuation system 150 includes a housing 152. Housing 152 incorporates drive wheel linkage 54 that is adapted to engage drive wheel 18. As shown, linkage 54 includes recesses 154 that are sized and positioned to couple to corresponding projections on the drive wheel. As discussed, however, linkage 54 may take any suitable form that is configured to drivingly engage with a corresponding structure on drive wheel 18 and/or drive wheel spacer 26. Housing 152 is further configured to form a drum-like cavity 164 on the interior of the cylinder shaped housing 152.

Torque attenuation system 150 includes resilient member 168 that couples the motor output linkage and the drive wheel linkage together, and which is adapted to delay the transmission of rotation between the motor output linkage and the drive wheel linkage. In some embodiments, member 168 may also be described as absorbing, at least temporarily, a difference in the relative rate of rotation of the motor output linkage and the drive wheel linkage. As shown, member 168 is a coil spring that is sized to fit within outer drum 164 and to receive an inner mandrel 166 around which member 168 extends. It should be noted that while resilient member 168 is shown in FIG. 7 as a coil spring, resilient member 168 may take other forms without departing from the scope of the present invention. More specifically, member 168 may be any suitable structure that couples the outer drum and inner mandrel together and temporarily delays the transmission of rotation between the drum and mandrel. Member 168 is adapted to deform (elastically, mechanically, or otherwise) to absorb at least temporarily a difference in the relative rate of rotation of the drum and mandrel, as discussed in more detail below. For example, member 168 may include one or more extension or compression springs, elastomeric bands, or the like.

Any suitable coupling mechanism may be used to mount the resilient member to the drum and mandrel. As shown, housing 152 includes an outer drum notch 163, which is configured to accept and retain a portion 165 of member 168. Also shown in FIG. 7 is another portion 169 of the resilient member that is adapted to be received and retained in a corresponding notch 167 (not shown) on the mandrel.

As discussed, the torque attenuator may be mounted on the same axle upon which drive wheel 18 is mounted. Torque attenuation system 150 illustrates a suitable construction for such an embodiment. As shown, inner mandrel 166 includes through bore 58, which is adapted to accommodate axle 16 of ride-on vehicle 10. Inner mandrel 166 further includes motor output linkage 56. In the illustrated embodiment, motor output linkage 56 includes recess portions 155 adapted to receive motor output teeth 38.

In FIG. 7, torque attenuation system 150 is shown further including a retention plate 170 to secure the resilient member and inner mandrel within drum 164. As shown, plate 170 is mounted on an open end of housing 152 and includes an aperture 172 sized to allow motor output linkage 56 to extend through the plate and couple to motor output 36.

Torque attenuation system 150 achieves the delay or controlled ramp up of transmission of rotational input through the interaction of the inner mandrel, the resilient member and the outer drum. These components may also be referred to as a force attenuating mechanism 160, in that they attenuate the rotational force imparted to the motor output linkage and conveyed to the drive wheel linkage. The operation of the force attenuation mechanism 160 can be better understood by referring to FIGS. 8–10, in which retention plate 170 is removed.

Figure 8:
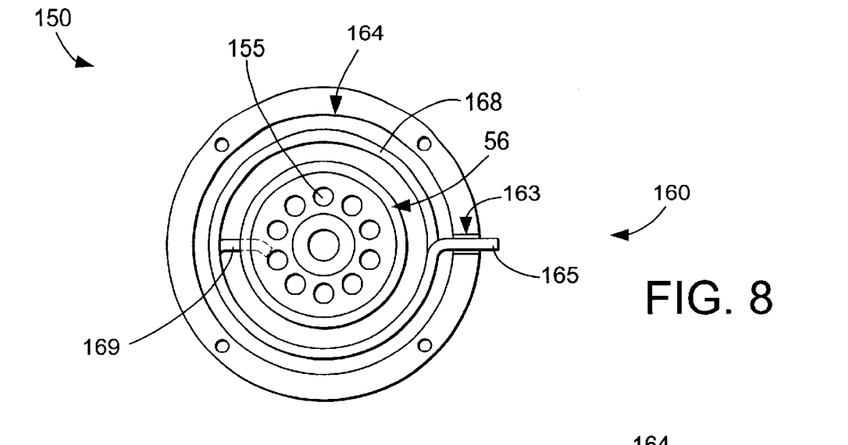
FIG. 8 is an end view of the torque attenuator of FIG. 6 in a rest position.

Referring to FIG. 8, an end view of torque attenuation system 150 is shown to illustrate the configuration of force reducing mechanism 160 in its neutral position. As shown, no torque or rotational motion is acting upon the system. When no torque acts upon the system, resilient member 168 is in a rest position approximately halfway between inner mandrel 166 and outer drum 164.

Figure 9:
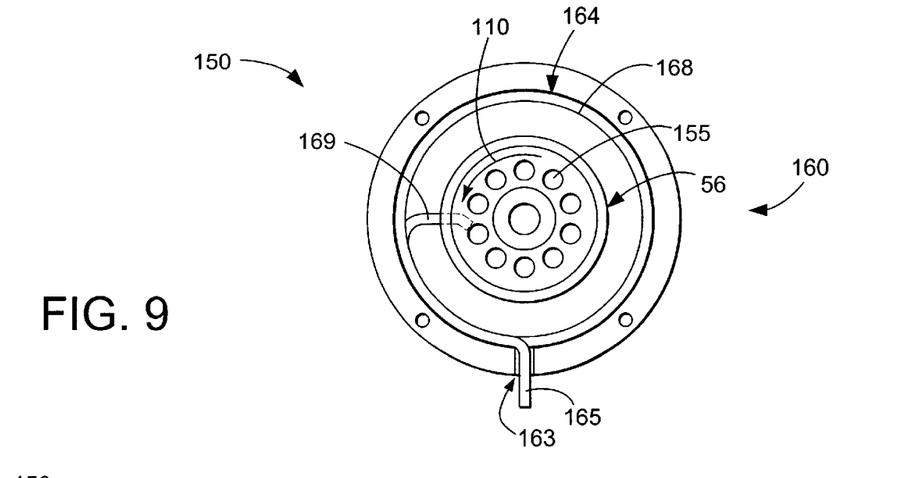
FIG. 9 is an end view of the torque attenuator of FIG. 6 in a first driving position for rotation in a first direction.

Turning to FIG. 9, a torque attenuation system 150 is shown under a counter clockwise torque or rotational output from motor output 36, as indicated by directional arrow 110. In response to this torque, resilient member 168 deforms by uncoiling and expanding outward as inner mandrel 166 rotates relative to drum 164. The mechanical energy expended by the rotation of inner mandrel 166 is stored, at least partially, in the deformation of resilient member 168. As resilient member 168 expands, it eventually contacts outer drum 164. Outer drum 164 prevents resilient member 168 from further expansion and thus causes resilient member 168 to transmit the rotation of inner mandrel 166 to outer drum 164. That is to say, resilient member 168 expands until it frictionally engages outer drum 164, at which point further transmission of rotational output to linkage 56 is transmitted to drive wheel 18. During the time period in which member 168 is expanding, at least a portion of the rotational output of motor output 36 that is transmitted to motor output linkage 56 (such as housing 152) is not being transmitted to drive wheel linkage 54 (such as mandrel 166). Therefore, the drive wheel linkage either will not rotate during this period, or it will rotate at a slower rate of rotation than the motor output linkage.

Figure 10:
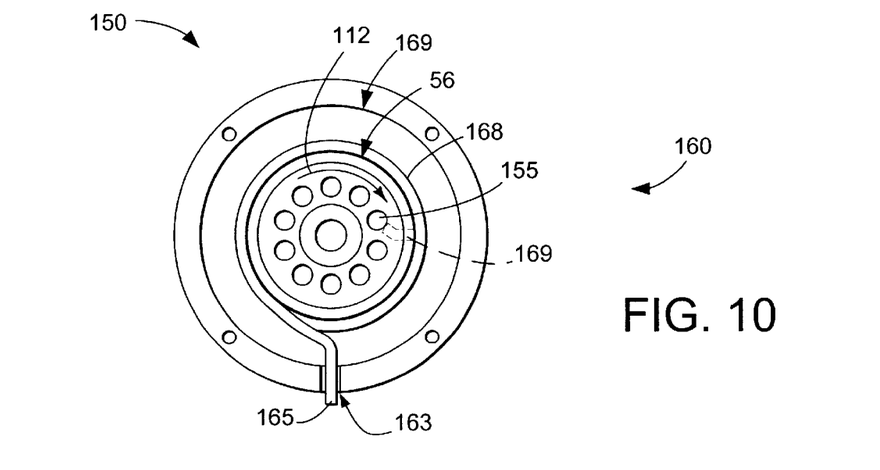
FIG. 10 is an end view of the torque attenuator of FIG. 6 in a second driving position for rotation in a second direction opposite the first direction.

Referring to FIG. 10, torque attenuation system 150 is shown under a clockwise torque or rotational output from motor output 36, as indicated by directional arrow 112. In response to this torque, or rotational output, resilient member 168 deforms by coiling up and contracting inward as inner mandrel 166 rotates relative to outer drum 164. The mechanical energy expended by the rotation of inner mandrel 166 is stored in the deformation of resilient member 168. As resilient member 168 contracts, it eventually comes into contact with inner mandrel 166. Resilient member 168 constricts around inner mandrel 166, at which point any further rotation of the inner mandrel is transmitted to the outer drum. During the time period in which member 168 is contracting, at least a portion of the rotational output of motor output 36 that is transmitted to motor output linkage 56 (such as housing 152) is not being transmitted to drive wheel linkage 54 (such as mandrel 166). Therefore, the drive wheel linkage either will not rotate during this period, or it will rotate at a slower rate of rotation than the motor output linkage.

In summary, the delay type attenuation system 150 extends the period of time over which the transmission of rotation from the motor output to drive wheel 18 takes place, compared to a similar drive assembly in which torque attenuation system 150 is not present. From a resting position, the delay-type torque attenuator, or torque attenuation system, will cause a softer start to the vehicle, even if the vehicle is suddenly urged to its full speed, because it delays the ramp up of the drive wheel's rotation. Similarly, if the direction of the vehicle is suddenly changed from forward to reverse, or reverse to forward, there will be a delay before the drive wheel is driven in the opposite direction. During this delay, the vehicle will slow down and the ramp up of rotation in the other direction will be controlled, namely, by extending the time period before which this rotation is transmitted fully to the drive wheel. Therefore, a child sitting on seat 14 will not experience the jerking motion conventionally felt if a children's ride-on vehicle is suddenly driven in either direction or reversed in direction. Similarly, the drive assembly and body of the vehicle will not be subjected to the damaging forces that conventionally are experienced when these rapid changes in speed and direction are encountered. It should be understood that the motor output linkage and drive wheel linkage of the torque attenuation system shown in FIGS. 7–10 may be reversed without departing from the scope of the invention. In such an embodiment, the inner mandrel will contain a motor output linkage 56 adapted to rotationally couple to motor output 36 and the housing will contain a drive wheel linkage adapted to rotationally couple to the drive wheel.

Another type of torque attenuator, or torque attenuating system, may be referred to as an interrupt type system because it at least temporarily interrupts the transmission of rotational output from the motor assembly to the drive wheel in response to a triggering event, such as an event that would otherwise impart more than a predetermined amount of torque or other force to the vehicle's drive assembly and body. For example, if a children's ride-on vehicle is suddenly changed from forward to reverse, or vice versa, while the vehicle is in motion, the vehicle will conventionally be subjected to considerable stresses on its body and drive assembly. An interrupt type torque attenuator is designed to at least temporarily interrupt the transmission of rotational output to the drive wheel when such an applied force exceeds a predetermined maximum force.

Figure 11:
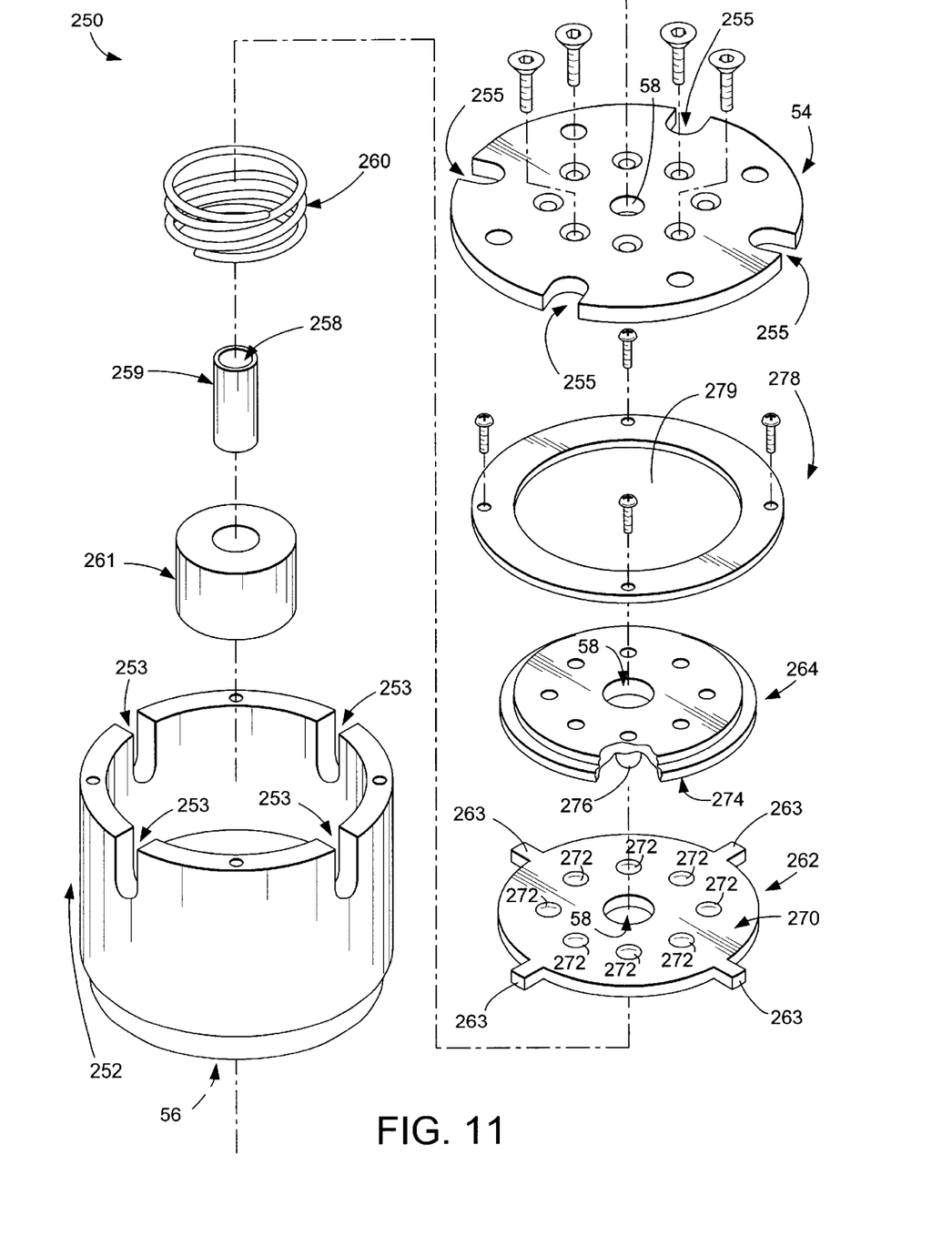
FIG. 11 is an exploded isometric view of another embodiment of a torque attenuator according to the present invention.

Referring to FIG. 11, an exploded assembly view of an illustrative embodiment of an interrupt type attenuation system is shown and generally indicated at 250. Attenuation system 250 includes a housing 252 with motor output linkage 56 and a plurality of races 253. System 250 further includes a biasing member 260, which in the illustrated embodiment is a coil spring, and a drive member 262, which includes interconnection prongs 263 that are configured to be received within the races of housing 252. The rotational output received by housing 252 through motor output linkage 56 is selectively transmitted to the drive member through races. Races 253 are shaped to enable drive member 262 to rotate with housing 252 while also being able to translate within the housing in a direction generally parallel to the motor output linkage and drive wheel linkage.

Also shown in FIG. 11 is a biasing member locator 261, which is positioned within housing 252 to act as a guide for resilient biasing member 260. An axle sleeve 259 is inserted into biasing member locator 261 with a through bore 58 for receiving axle 16 of ride-on vehicle 10. Biasing member locator 261 is sized such that resilient biasing member 260 fits around it. Resilient biasing member 260 is positioned around biasing member locator 261 and is adapted to exert an engaging force against drive member 262. It should be understood that while resilient biasing member 260 is shown in FIG. 11 as a coil spring, any other suitable resilient biasing structure may be used to exert an engaging force that biases drive member 262 against the subsequently described driven member. For example, member 260 may include one or more leaf springs, extension springs, elastomeric members or the like. Similarly, it should be understood that system 250 may be formed without sleeve 259 and/or locator 261.

Drive member 262 is biased against a corresponding driven member 264 by the engaging force exerted by biasing member 260. Drive member 262 includes a drive member engaging portion 270, which is adapted to engage a corresponding driven member engagement portion 274 on driven member 264. Drive member detent structure 272 is adapted to engage driven member detent structure 276 to mechanically interlock the drive member and the driven member. As such, drive member engaging portion 270 may include a detent structure 272, which, as shown, takes the form of protrusions. Similarly, driven member engaging portion 274 may include a detent structure 276, which, as shown, takes the form of recesses sized to selectively receive corresponding protrusions on drive member engaging portion 270. It should be understood that the drive member detent structure and the driven member detent structure may each include one or more recesses or protrusions. It should be further understood that the drive member detent structure recesses are sized and positioned to engage the driven member protrusions and vice versa. Although detent structures 272 and 274 have been illustrated in the form of protrusions and recesses, any other suitable structure may be used to selectively and releasably interlock the drive and driven member engaging portions. For example, the portions may be selectively interlocked by the frictional force caused by the portions engaging each other under the engagement force from biasing member 260, at least one of the members may include teeth, or one or more of the members may include deformable tabs or other projections.

Also shown in FIG. 11 is a retention ring 278 that is configured to secure driven member 264 into housing 252. Retention ring 278 includes an aperture 279 that allows a portion of driven member 264 to extend through the ring. The aperture of retention ring 278 allows drive wheel linkage 54 to be attached to the driven member. Drive wheel linkage 54 includes drive wheel detent structure 255. Drive wheel linkage detent structure 255 engages corresponding detent structure 19 of drive wheel 18. Alternatively, driven member 264 may itself form drive wheel linkage 54 by including suitable structure, such as detent structure 255, to rotatably couple the driven member to drive wheel 18 or drive wheel spacer 26. Ring 278 also may be describes as providing a self-contained torque attenuator because it prevents the contents of housing 252 from being removed from the housing. Therefore, the system remains intact, even when it is not installed on a children's ride-on vehicle.

As previously mentioned, the interrupt type attenuation system 250 is adapted to temporarily stop or interrupt the transmission of rotation to the drive wheel when a torque threshold is exceeded. The torque threshold is exceeded when an applied torque from the motor output causes drive member 262 to rotate relative to driven member 264. The triggering event that causes this torque to be exerted may include an acceleration of ride-on vehicle 10 or a reversal of the direction of ride-on vehicle 10. The interaction of the components of torque attenuation system 250, in response to a triggering event, is best illustrated by FIGS. 12–14.

Figure 12:
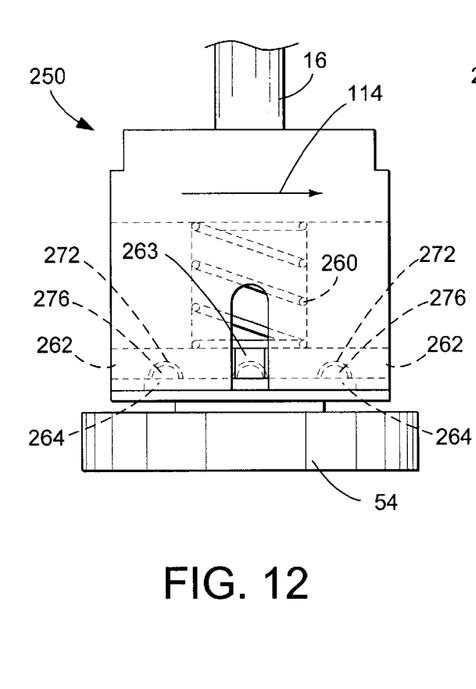
FIG. 12 is a side view of the torque attenuator of FIG. 11 configured for transmitting rotation to a drive wheel.

Referring initially to FIG. 12, the torque attenuation system is shown rotating in the direction of arrow 114. Both drive member 262 and driven member 264 are rotating together as a unit at the same rate before a triggering event occurs. This configuration will also exist if ride-on vehicle 10 is at rest, in which case drive member 262 and driven member 264 would be engaged and will not be rotating. The drive member detent structure 272 is aligned for engagement with the driven member detent structure 276. As the system rotates as a unit without the occurrence of a triggering event, these two detent structures remain aligned and engaged, and the drive and driven members will rotate as a unit. Therefore, the rotational output of the motor output will be transmitted to the drive wheel.

Figure 13:
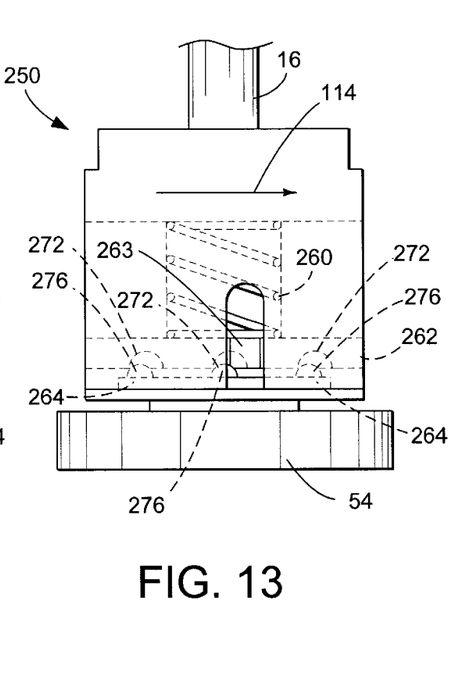
FIG. 13 is a side view of the torque attenuator of FIG. 11 showing partial response to an applied torque that exceeds the attenuator's threshold magnitude.

FIG. 13 illustrates the torque attenuator, or torque attenuation system, upon the occurrence of a triggering event. As shown, the drive and driven members are no longer aligned and have rotated relative to each other. As the drive member rotates, the drive member detent structure 272 climbs over or rides out of the driven member detent structure 276. This ride out causes the disengagement force that urges the resilient biasing member 260 into compression. The drive member and driven member shown in FIG. 13 are still engaged but the detent structures have started to ride out or move apart.

Figure 14:
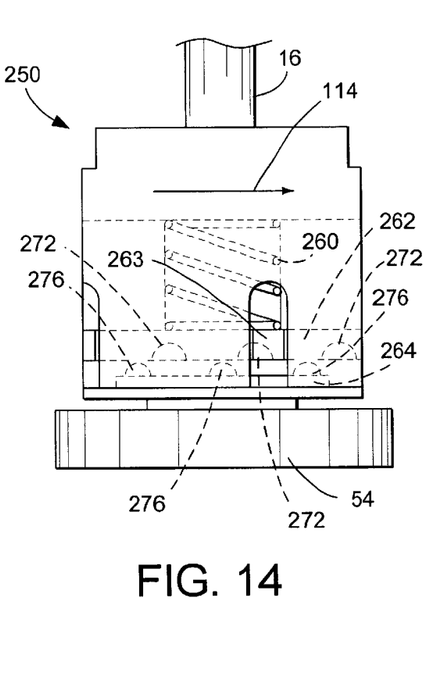
FIG. 14 is a side view of the torque attenuator of FIG. 11 fully responding to an applied torque that exceeds the attenuator's threshold magnitude by interrupting the transmission of rotation to the drive wheel.

FIG. 14 illustrates the position of the torque attenuator when the torque causing the triggering event is sufficient to cause the drive detent structure to completely ride out or climb over the driven detent structure. Under these conditions, the transmission of rotation to the drive wheel from the motor output ceases because drive member 262 and driven member 264 are no longer engaged and therefore do not rotate as a unit. The disengaging force caused by the applied torque completely disengages the drive member detent structure 272 from the driven member detent structure 276 and the drive member and the driven member rotate independent of one another. As long as the torque being applied to the drive member exceeds the threshold, the drive member and the driven member will continue to rotate independently.

When the magnitude of the triggering torque decreases below the torque threshold, the drive detent structure 272 again engages the driven detent structure 276. This reengagement of the detent structures occurs because the engaging force exceeds the disengaging force. When this reengagement occurs, torque attenuation system 250 returns to the configuration shown in FIG. 12.

In other words, the motor output transmits a rotational input to motor output linkage 56. This rotational input urges the drive and driven members to move apart from each other, and therefore no longer rotate as a unit, against the engaging force of biasing member 260. When the engaging force exceeds this disengaging force, the drive and driven members will continue to rotate as a unit. However, when the disengaging force exceeds the engaging force, the drive and driven members disengage each other and no longer rotate as a unit. When this occurs, the rotational output of the motor output is no longer transmitted to the drive wheel. Should this disengaging force decrease to a level below the engaging force, then the detent structures will reengage and the drive and driven members will again rotate as a unit, thereby enabling the transmission of the rotational output of the motor output to the drive wheel.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:
1. A children's ride-on vehicle, comprising:
a reduced scale body having a passenger region with a seat configured to accommodate at least one child;
a plurality of wheels rotatably coupled to the body and including a drive wheel and a steerable wheel;
a steering assembly having a steering mechanism positioned for operation by a child sitting on the seat, wherein the steering assembly is coupled to the steerable wheel;
a drive assembly including the drive wheel and a battery powered motor assembly with a motor output; and
a torque attenuation system configured to regulate the transmission of torque from the motor assembly to the drive wheel, wherein the torque attenuation system includes a force reducing mechanism adapted to receive a rotational input from the motor output and regulate the transmission thereof to the drive wheel and a motor output linkage rotationally coupled to the motor output and adapted to transmit the rotational input from the motor output to the force reducing mechanism, wherein the torque attenuation system is adapted to interrupt the transmission of the rotational input to the drive wheel when a torque threshold is exceeded by an applied torque from the motor output, wherein the force reducing mechanism includes a drive member, a driven member and a resilient member; wherein the transmission of the rotational input is caused by engagement of the drive member and the driven member, wherein the resilient member is configured to exert an engaging force to bias the drive member and the driven member together to rotate as a unit, wherein the drive member includes a drive member engagement portion that includes a drive detent structure and the driven member includes a driven member engagement portion that includes a driven detent structure configured to engage the drive detent structure; and further wherein the drive member engagement portion is configured to couple with the driven member engagement portion for rotation as a unit when the torque threshold is not exceeded, wherein the torque attenuation system is configured to respond to an applied torque from the motor output having a magnitude that exceeds the torque threshold by applying a disengaging force to oppose the engaging force and thereby deform the resilient member and disengage the drive member and driven member for rotation independent of one another, and further wherein the torque attenuation system is configured to respond to a subsequent reduction in the magnitude of the applied torque below the torque threshold by reducing the disengaging force so that the engaging force again biases the drive member and driven member together to rotate as a unit.

2. The ride-on vehicle of claim 1, wherein the resilient member biases the drive member engagement portion and the driven member engagement portion into frictional engagement with each other.

3. The ride-on vehicle of claim 1, wherein at least one of the drive detent structure and the driven detent structure includes at least one recess portion and at least one of the drive detent structure and the driven detent structure includes at least one protrusion portion configured to align with the at least one recess portion to mechanically interlock the drive member and the driven member.

4. The ride-on vehicle of claim 3, wherein the at least one protrusion portion is hemispherical.

5. The ride-on vehicle of claim 3, wherein the at least one protrusion portion is biased into engagement with the at least one recess portion by the resilient member and adapted to be urged out of engagement with the at least one recess portion by the rotational input.

6. The ride-on vehicle of claim 5, wherein the at least one protrusion portion is adapted to disengage the at least one recess portion when the rotational input exceeds an engagement force exerted by the resilient member.

7. A children's ride-on vehicle, comprising:
  a reduced scale chassis having a seat configured to accommodate at least one child;
  a drive assembly including a drive wheel and a battery powered motor assembly with a motor output;
  a motor output linkage adapted to engage the motor output;
  a drive wheel linkage adapted to engage the drive wheel; and
  a torque attenuator configured to selectively transmit torque from the motor output linkage to the drive wheel linkage, wherein the torque attenuator is adapted to temporarily interrupt the transmission of torque to the drive wheel linkage and delay the transmission thereof in response to a triggering event, wherein the torque attenuator comprises:
    a drive member rotationally coupled to the motor output linkage and including a drive member engagement portion, wherein the drive member engagement portion includes a drive detent structure;
    a driven member rotationally coupled to the drive wheel linkage and including a driven member engagement portion that is configured to couple with the drive member engagement portion for rotation as a unit, wherein the driven member engagement portion includes a driven detent structure that is configured to engage the drive detent structure; and
    a resilient member configured to exert an engaging force to bias the drive member and the driven member together to rotate as a unit and to transmit torque from the motor output linkage to the drive wheel linkage; and
  wherein the torque attenuator is configured to respond to an applied torque from the motor output, wherein the applied torque has a magnitude that exerts a disengaging force to oppose the engaging force, wherein upon receipt of an applied torque that exerts a disengaging force that exceeds the engaging force, the torque attenuator is adapted to disengage the drive member and the driven member for rotation independent of one another, and further wherein the torque attenuator is configured to respond to a subsequent reduction in the disengaging force below the engaging force by biasing the drive member and the driven member back into engagement with each other to rotate as a unit.

8. The children's ride-on vehicle of claim 7, wherein the resilient member biases the drive member engagement portion and the driven member engagement portion into frictional engagement with each other.

9. The children's ride-on vehicle of claim 7, wherein at least one of the drive detent structure and the driven detent structure includes at least one recess portion and at least one of the drive detent structure and the driven detent structure includes at least one protrusion portion configured to align with the at least one recess portion to mechanically interlock the drive member and the driven member.

10. The children's ride-on vehicle of claims 9, wherein the at least one protrusion portion is hemispherical.

11. The children's ride-on vehicle of claim 10, wherein the at least one protrusion portion is biased into engagement with the at least one recess portion by the resilient member and adapted to be urged out of engagement with the at least one recess portion by the applied torque.

12. The children's ride-on vehicle of claim 7, wherein the triggering event includes a reversal of the direction of rotation of the motor output.

13. The children's ride-on vehicle of claim 12, wherein the triggering event further includes a change in the acceleration of the ride-on vehicle.

14. The children's ride-on vehicle of claim 7, wherein the torque attenuator includes a plurality of operating states, including an unregulated operating state in which the applied torque is transmitted to the drive wheel, and a regulated operating state in which the torque attenuator is adapted to transmit only a portion of the applied torque to the drive wheel, and further wherein the torque attenuator is adapted to automatically transition between its operating states responsive to the applied torque received from the motor output.

15. The children's ride-on vehicle of claim 14, wherein the torque attenuator is adapted to selectively reduce the magnitude of the applied torque that is transmitted to the drive wheel.

16. The children's ride-on vehicle of claim 14, wherein the torque attenuator is adapted to selectively delay the transmission of the applied torque to the drive wheel.

17. A children's ride-on vehicle, comprising:
  a reduced scale chassis having a seat configured to accommodate at least one child;
  a drive assembly including a drive wheel and a battery powered motor assembly with a motor output;
  a motor output linkage adapted to engage the motor output and receive a rotational input therefor;
  a drive wheel linkage adapted to engage the drive wheel; and
  a torque attenuator configured to selectively transmit torque from the motor output linkage to the drive wheel linkage, wherein the torque attenuator is adapted to temporarily interrupt the transmission of torque to the drive wheel linkage and delay the transmission thereof in response to a triggering event, and further wherein the triggering event includes a positive acceleration of the ride-on vehicle.

18. The children's ride-on vehicle of claim 17, wherein the drive wheel linkage includes a detent structure that is adapted to be coupled to the drive wheel to rotationally couple the drive wheel linkage and the drive wheel together.

19. The children's ride-on vehicle of claim 18, wherein the drive wheel includes a hub that includes a tooth structure that is adapted to engage the detent structure of the drive wheel linkage to rotationally couple the drive wheel and the drive wheel linkage together.

20. The children's ride-on vehicle of claim 17, wherein the triggering event further includes a reversal of the direction of rotation of the motor output.

21. The children's ride-on vehicle of claim 17, wherein the torque attenuator includes a force reducing mechanism comprising:

an outer drum engaging a first rotational portion of the drive assembly and configured to rotate therewith;

an inner mandrel engaging a second rotational portion of the drive assembly and configured to rotate therewith; and a resilient power transmission member positioned around the inner mandrel and within the outer drum, wherein the resilient power transmission member rotationally connects the outer drum and inner mandrel, and further wherein a difference in the rotation between the outer drum and the inner mandrel is absorbed by the resilient power transmission member.

22. The children's ride-on vehicle of claim 21, wherein the resilient power transmission member includes a coil spring.

23. The children's ride-on vehicle of claim 22, wherein the coil spring is adapted to tighten around the inner mandrel, or expand to frictionally engage the outer drum responsive to the direction of rotation of the motor output.

24. The children's ride-on vehicle of claim 21, wherein the force reducing mechanism has a first end adapted to engage the motor output and a second end adapted to engage the drive wheel.

25. The children's ride-on vehicle of claim 24, wherein the inner mandrel is:coupled to the first end at the motor output linkage and the outer drum is coupled to the second end at the drive wheel linkage.

26. The children's ride-on vehicle of claim 17, wherein the torque attenuator further comprises:

a drive member rotationally coupled to the motor output linkage, a driven member rotationally coupled to the drive wheel linkage; and a resilient member-configured to exert an engaging force to bias the drive member and the driven member together to rotate as a unit and to transmit torque from the motor output linkage to the drive wheel linkage.

27. The children's ride-on vehicle of claim 26, wherein the torque attenuator is configured to respond to an applied torque from the motor output, wherein the applied torque has a magnitude that exerts a disengaging force to oppose the engaging force.

28. The children's ride-on vehicle of claim 27, wherein upon receipt of an applied torque that exerts a disengaging force that exceeds the engaging force, the torque attenuator is adapted to disengage the drive member and the driven member for rotation independent of one another.

29. The children's ride-on vehicle of claim 28, wherein the torque attenuator is configured to respond to a subsequent reduction in the disengaging force below the engaging force by biasing the drive member and the driven member back into engagement with each other to rotate as a unit.

30. The children's ride-on vehicle of claim 29, wherein the drive member includes a drive member engagement portion and the driven member includes a driven member engagement portion, and further wherein the drive member engagement portion is configured to couple with the driven member engagement portion for rotation as a unit.

31. The children's ride-on vehicle of claim 30, wherein the resilient member biases the drive member engagement portion and the driven member engagement portion into frictional engagement with each other.

32. The children's ride-on vehicle of claim 30, wherein the drive member engagement portion includes a drive detent structure and the driven member engagement portion includes a driven detent structure configured to engage the drive detent structure.

33. The children's ride-on vehicle of claim 32, wherein at least one of the drive detent structure and the driven detent structure includes at least one recess portion and at least one of the drive detent structure and the driven detent structure includes at least one protrusion portion configured to align with the at least one recess portion to mechanically interlock the drive member and the driven member.

34. The children's ride-on vehicle of claim 33, wherein the at least one protrusion portion is hemispherical.

35. The children's ride-on vehicle of claim 34, wherein the at least one protrusion portion is biased into engagement with the at least one recess portion by the resilient member and adapted to be urged out of engagement with the at least one recess portion by the rotational input.

36. The children's ride-on vehicle of claim 17, wherein the motor output includes a plurality of output teeth and further wherein the motor output linkage includes a recess structure that is adapted to engage the plurality of output teeth to rotationally couple the motor output and the motor output linkage together.

37. The children's ride-on vehicle of claim 17, wherein the drive assembly includes an axle upon which the torque attenuator is mounted.

38. The children's ride-on vehicle of claim 37, wherein the torque attenuator includes a housing with a through bore through which the axle extends.

39. The children's ride-on vehicle of claim 17, wherein the torque attenuator includes a plurality of operating states, including an unregulated operating state in which the rotational input is transmitted to the drive wheel, and a regulated operating state in which the force reducing mechanism is adapted to transmit only a portion of the rotational input to the drive wheel, and further wherein the force reducing mechanism is adapted to automatically transition between its operating states responsive to the rotationally input received from the motor output.

40. If The children's ride-on vehicle of claim 39, wherein the torque attenuator is adapted to selectively reduce the magnitude of the rotational input that is transmitted to the drive wheel.

41. The children's ride-on vehicle of claim 39, wherein the torque attenuator is adapted to selectively delay the transmission of the rotational input to the drive wheel.

42. The children's ride-on vehicle of claim 17, wherein the drive assembly includes a spacer that rotationally interconnects the drive wheel and the drive wheel linkage.

43. The children's ride-on vehicle of claim 17, wherein the drive wheel is not adapted to be directly coupled to the drive wheel linkage, and further wherein the drive assembly includes a spacer that is adapted to extend between the drive wheel and the drive wheel linkage to rotationally couple the drive wheel and the drive wheel linkage together.

44. The children's ride-on vehicle of claim 17, wherein the drive assembly includes a spacer that rotationally interconnects the motor output and the motor output linkage.

45. The children's ride-on vehicle of claim 17, wherein the motor output is not adapted to be directly coupled to the motor output linkage, and further wherein the drive assembly includes a spacer that is adapted to extend between the motor output and the motor output linkage to rotationally couple the motor output and the motor output linkage together.

46. A self-contained torque attenuation system for reducing drive assembly stresses in a children's ride-on vehicle having a drive assembly with a battery-powered motor assembly and a drive wheel, the torque attenuation system comprising:

a housing configured to be coupled to a children's ride-on vehicle drive assembly between the motor assembly and the drive assembly, wherein the housing includes a motor output linkage configured to rotationally couple to an output of a motor assembly having a rate of rotation, a drive wheel linkage configured to rotationally couple to a drive wheel having a rate of rotation, and a resilient member configured to respond to a difference in the rate of rotation of the motor output linkage and the rate of rotation of the drive wheel linkage by interrupting the transmission of rotation from the motor output linkage to the drive wheel linkage, wherein the difference in the rate of rotation of the motor output linkage and the rate of rotation of the drive wheel linkage is caused by a triggering event that includes an applied torque from the motor output linkage that exceeds a magnitude threshold, and wherein the system further comprises a drive member that includes a drive detent structure and a driven member that includes a driven detent structure adapted to engage the drive detent structure, wherein the resilient member is configured to bias the drive member and the driven member together.

47. The torque attenuation system of claim 46, wherein the resilient member is configured to store mechanical energy by elastically deforming as the motor output linkage and the drive wheel linkage rotate at different rates.

48. The torque attenuation system of claim 46, wherein the resilient member is configured to compress in response to an applied torque of a magnitude that exceeds the threshold and enables the drive detent structure to disengage the driven detent structure, thereby permitting the drive member and the driven member to rotate at different rates.

49. The torque attenuation system of claim 46, further comprising:

a through bore adapted to accommodate an axle of a children's ride-on vehicle, wherein the housing is configured to mount on the axle via the through bore and align the motor output linkage with the output of the motor assembly.

50. The torque attenuation system of claim 46, wherein the system includes a plurality of operating states, including an unregulated operating state in which the applied torque is transmitted to the drive wheel, and a regulated operating state in which the system is adapted to transmit only a portion of the applied torque to the drive wheel, and further wherein the system is adapted to automatically transition between its operating states responsive to the applied torque received from the motor output.

51. The torque attenuation system of claim 50, wherein the system is adapted to selectively delay the transmission of the applied torque to the drive wheel.

52. The torque attenuation system of claim 50, wherein the system is adapted to selectively reduce the magnitude of the applied torque that is transmitted to the drive wheel.

53. A self-contained torque attenuation system for reducing drive assembly stresses in a children's ride-on vehicle having a drive assembly with a battery powered motor assembly and a drive wheel, the torque attenuation system comprising:

a housing configured to be coupled to a children's ride-on vehicle drive assembly between the motor assembly and the drive assembly, wherein the housing includes a motor output linkage configured to rotationally couple to an output of a motor assembly having a rate of rotation to receive a rotational input therefrom, a drive wheel linkage configured to rotationally couple to a drive wheel having a rate of rotation, and a resilient member configured to respond to a difference in the rate of rotation of the motor output linkage and the rate of rotation of the drive wheel linkage by interrupting the transmission of rotation from the motor output linkage to the drive wheel linkage, wherein the difference in the rate of rotation of the motor output linkage and the rate of rotation of the drive wheel linkage is caused by a triggering event that includes an applied torque from the motor output linkage that exceeds a magnitude threshold, and further wherein the housing includes a through bore adapted to accommodate an axle of a children's ride-on vehicle, wherein the housing is configured to mount on the axle via the through bore and align the motor output linkage with the output of the motor assembly.

54. The torque attenuation system of claim 53, wherein the resilient member is configured to store mechanical energy by elastically deforming as the motor output linkage and the drive wheel linkage rotate at different rates.

55. The torque attenuation system of claim 53, wherein the system includes a plurality of operating states, including an unregulated operating state in which the rotational input is transmitted to the drive wheel, and a regulated operating state in which the system is adapted to transmit only a portion of the rotational input to the drive wheel, and further wherein the system is adapted to automatically transition between its operating states responsive to the rotational input received from the motor output.

56. The torque attenuation system of claim 55, wherein the torque attenuation system is adapted to selectively reduce the magnitude of the rotational input that is transmitted to the drive wheel.

57. The torque attenuation system of claim 55, wherein the torque attenuation system is adapted to selectively delay the transmission of the rotational input to the drive wheel.

58. The torque attenuation system of claim 53, further comprising:

an inner mandrel through which the through bore extends; and an outer drum sized to accommodate the inner mandrel and the resilient member; wherein the resilient member rotationally couples the inner mandrel and outer drum and is configured to absorb a difference in rotation between the outer drum and inner mandrel.

59. The torque attenuation system of claim 53, further comprising:

a drive member rotationally coupled to the motor output linkage; and a driven member rotationally coupled to the drive wheel linkage, wherein the resilient member is configured to exert an engaging force to bias the drive member and the driven member together to rotate as a unit and transmit rotation from the drive member to the driven member.

* * * * *